(12) United States Patent
Yamamoto et al.

(10) Patent No.: US 10,293,599 B2
(45) Date of Patent: *May 21, 2019

(54) METHOD AND DEVICE FOR PRODUCING DECORATIVE ARTICLE, AND DECORATIVE ARTICLE

(71) Applicant: RISO KAGAKU CORPORATION, Tokyo (JP)

(72) Inventors: Hirotaka Yamamoto, Ibaraki (JP); Sayako Arai, Ibaraki (JP); Mamoru Saito, Ibaraki (JP); Ami Terakado, Ibaraki (JP); Akiko Hayashi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 193 days.

This patent is subject to a terminal disclaimer.

(21) Appl. No.: 15/029,204

(22) PCT Filed: Nov. 28, 2014

(86) PCT No.: PCT/JP2014/081543
§ 371 (c)(1),
(2) Date: Apr. 13, 2016

(87) PCT Pub. No.: WO2015/080246
PCT Pub. Date: Jun. 4, 2015

(65) Prior Publication Data
US 2016/0229177 A1 Aug. 11, 2016

(30) Foreign Application Priority Data

Nov. 29, 2013 (JP) ................................ 2013-248224
Apr. 30, 2014 (JP) ................................ 2014-093740
Sep. 29, 2014 (JP) ................................ 2014-198206

(51) Int. Cl.
*B41J 2/01* (2006.01)
*C09D 11/322* (2014.01)
(Continued)

(52) U.S. Cl.
CPC .............. *B41J 2/01* (2013.01); *B41M 5/0011* (2013.01); *C09D 11/10* (2013.01); *C09D 11/322* (2013.01); *C09D 175/04* (2013.01)

(58) Field of Classification Search
None
See application file for complete search history.

(56) References Cited

U.S. PATENT DOCUMENTS 5,984,466 A  11/1999  Nagashima et al.
2003/0010258 A1  1/2003  Fukuda et al.
(Continued)

FOREIGN PATENT DOCUMENTS

CN  1736935 A  2/2006
CN  101120065 A  2/2008
(Continued)

OTHER PUBLICATIONS

Machine Translation of JP 2011-026871 A (Year: 2011).*
(Continued)

*Primary Examiner* — Shamim Ahmed
*Assistant Examiner* — Bradford M Gates
(74) *Attorney, Agent, or Firm* — Hamre, Schumann, Mueller & Larson, P.C.

(57) ABSTRACT

The present invention discloses a method for producing a decorative article which includes a step of performing inkjet printing onto the surface of a humidity-conditioning base material using an aqueous inkjet ink containing at least water, a water-dispersible resin and a colorant, and also discloses a device for producing the decorative article.

15 Claims, 1 Drawing Sheet

(51) Int. Cl.
   *C09D 175/04* (2006.01)
   *B41M 5/00* (2006.01)
   *C09D 11/10* (2014.01)

(56) References Cited

U.S. PATENT DOCUMENTS

| | | |
|---|---|---|
| 2003/0179269 A1 | 9/2003 | Yamanouchi et al. |
| 2004/0209976 A1 | 10/2004 | Nakhmanovich et al. |
| 2007/0052785 A1 | 3/2007 | Itoh et al. |
| 2008/0022887 A1 | 1/2008 | Tanoue et al. |
| 2008/0282932 A1 | 11/2008 | Kiyomoto et al. |
| 2009/0182098 A1 | 7/2009 | Sano et al. |
| 2010/0196601 A1 | 8/2010 | Goto et al. |
| 2010/0277541 A1 | 11/2010 | Watanabe et al. |
| 2010/0295891 A1 | 11/2010 | Goto et al. |
| 2011/0164086 A1 | 7/2011 | Ggoto et al. |
| 2012/0232203 A1 | 9/2012 | Tomura et al. |
| 2013/0053485 A1 | 2/2013 | Misawa et al. |
| 2014/0139595 A1 | 5/2014 | Hong et al. |
| 2015/0017402 A1 | 1/2015 | Suzuki et al. |
| 2015/0105504 A1 | 4/2015 | Verheggen et al. |
| 2016/0229177 A1 | 8/2016 | Yamamoto et al. |

FOREIGN PATENT DOCUMENTS

| | | |
|---|---|---|
| CN | 101541895 A | 9/2009 |
| CN | 101842244 A | 9/2010 |
| CN | 101909898 A | 12/2010 |
| CN | 102741367 A | 10/2012 |
| CN | 104379684 A | 2/2015 |
| CN | 105637156 A | 6/2016 |
| EP | 1469049 A1 | 10/2004 |
| EP | 1759858 A1 | 3/2007 |
| JP | 6-344654 A | 12/1994 |
| JP | 2002-004447 | 1/2002 |
| JP | 2002-067474 A | 3/2002 |
| JP | 2002-154864 | 5/2002 |
| JP | 2003-146775 | 5/2003 |
| JP | 2004-322656 A | 11/2004 |
| JP | 2006-192587 A | 7/2006 |
| JP | 2007044614 | 2/2007 |
| JP | 2007-154433 A | 6/2007 |
| JP | 2008284874 A | 11/2008 |
| JP | 2011-026871 | 2/2011 |
| JP | 2011093306 A | 5/2011 |
| JP | 5711838 B1 | 5/2015 |
| WO | 02/100652 | 12/2002 |
| WO | 2012170036 A1 | 12/2012 |
| WO | 2013/129523 | 9/2013 |
| WO | 2013/131924 A1 | 9/2013 |
| WO | 2013/189746 A1 | 12/2013 |
| WO | 2014135843 | 9/2014 |
| WO | 2014147373 | 9/2014 |
| WO | 2015/080246 | 6/2015 |
| WO | 2015115600 | 8/2015 |

OTHER PUBLICATIONS

Extended European Search Report, European Patent Application No. 14865517.8, dated May 30, 2017 (9 pages).
International Search Report for PCT/JP2014/081543, dated Mar. 3, 2015, and English translation thereof, 4 pages total.
Japanese Office Action dated Nov. 4, 2014 in JP application No. 2014-198206, 2 pages total.
Japanese Office Action dated Jan. 6, 2015 in JP application No. 2014-198206, 3 pages total.
Chinese Office Action, Chinese Patent Application No. 201480056405.5, dated Dec. 12, 2016.
English Translation of the International Preliminary Report on Patentability for PCT/JP2014/081543, dated Jun. 9, 2016 (9 pages).
Extended European Search Report, dated Jul. 5, 2016, European Patent Application 16163505.7 (8 pages).
Extended European Search Report, dated May 27, 2016; European Patent Application No. 16163504.0 (9 pages).
Japanese Official Action, Japanese Patent Application No. 2015-048512, dated Jun. 26, 2018 (2 pages).
Chinese Office Action, issued in the corresponding Chinese patent application No. 201610236968.3, dated Sep. 29, 2018, (30 pages, including machine translation).
Chinese Office Action, issued in the corresponding Chinese patent application No. 201610237310.4, dated Sep. 29, 2018, (21 pages, including machine translation).
Japanese Office Action, issued in the corresponding Japanese patent application No. 2015-092987, dated Dec. 11, 2018, (1 page).

* cited by examiner

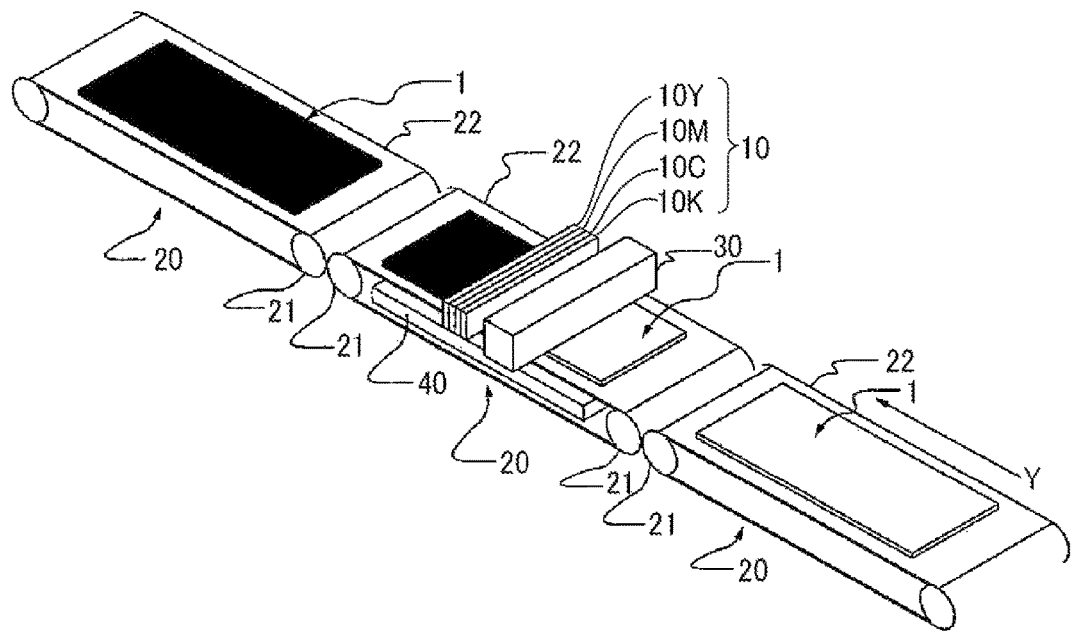

METHOD AND DEVICE FOR PRODUCING DECORATIVE ARTICLE, AND DECORATIVE ARTICLE

TECHNICAL FIELD

The present invention relates to a method for producing a decorative article by decorating the surface of a humidity-conditioning base material that can be used as the material for a humidity-conditioning construction material or the like, and also relates to a device that is suitable for use in this method, and a decorative article.

BACKGROUND ART

Humidity-conditioning construction materials are fabricated from porous materials, and therefore have a multitude of pores in their surfaces, and because these pores exhibit moisture adsorption and desorption properties, these construction materials have the ability to control the humidity within a target space such as an indoor room.

Under the humidity-conditioning construction material certification system, humidity-conditioning construction materials which satisfy certain humidity-conditioning properties and other conditions prescribed in humidity-conditioning construction material standards (Non-Patent Document 1) can be registered with the Japan Construction Material & Housing Equipment Industries Federation, and a special humidity-conditioning construction material mark can be displayed on registered humidity-conditioning construction materials as a guarantee of quality. Within these humidity-conditioning construction material standards, the registration conditions relating to the humidity-conditioning properties require that the material clears prescribed levels for the amount of moisture adsorption and desorption (JIS A 1470-1:2002, Determination of water vapor adsorption/desorption properties for building materials—Part 1: Response to humidity variation—method for testing water vapor adsorption/desorption upon humidity variation) and the equilibrium moisture content (namely, the moisture content gradient and the average equilibrium moisture content) (JIS A 1475:2004, Method of test for hygroscopic sorption properties of building materials).

Further, in humidity-conditioning performance evaluation standards for humidity-conditioning construction materials compiled in March 2006 by the Humidity-Conditioning Construction Materials Performance Evaluation Committee (Non-Patent Document 2), humidity-conditioning construction materials are classified into three grades shown below in Table 1 on the basis of the aforementioned amount of moisture adsorption and desorption and the equilibrium moisture content. Grade 1 describes a material that satisfies the minimum level of performance required for a humidity-conditioning construction material, grade 3 describes a material having excellent performance as a humidity-conditioning construction material, and grade 2 describes a material having performance midway between grade 1 and grade 3. These humidity-conditioning performance evaluation standards for humidity-conditioning construction materials are listed on the website of the Japan Testing Center for Construction Materials (http://www.jtccm.or.jp/main_services/seino/seino_jigyou_cyositu.html). In the case of the moisture adsorption and desorption properties, the standards stipulate that the amount of moisture adsorption at a relative humidity of 50 to 75% should exceed the numerical value shown below in Table 1, and the amount of moisture desorption after 12 hours should be about 70% or more of the amount of moisture adsorption over 12 hours, whereas in the case of the equilibrium moisture content, the standards stipulate that the value for the equilibrium moisture content in the moisture adsorption process (the moisture content mass by volume) should exceed the numerical value shown below in Table 1.

TABLE 1

| JIS A 1470-1 (Amount of moisture adsorption $g/m^2$) | | | |
|---|---|---|---|
| Amount of moisture adsorption | 3 hours | 6 hours | 12 hours |
| Grade 3 | 36 | 50 | 71 |
| Grade 2 | 25 | 35 | 50 |
| Grade 1 | 15 | 20 | 29 |

| JIS A 1475 (Moisture content gradient $\Delta\psi$ ($kg/m^3$/%), average equilibrium moisture content $\psi$ ($kg/m^3$)) | | |
|---|---|---|
| Equilibrium moisture content | Moisture content gradient | Average equilibrium moisture content |
| Grade 3 | 0.4 | 18 |
| Grade 2 | 0.26 | 11 |
| Grade 1 | 0.12 | 5 |

(Note)
Average equilibrium moisture content describes the value at a relative humidity of 55%

Known humidity-conditioning construction materials include materials fabricated from all manner of porous materials, and examples of humidity-conditioning construction materials containing an unexpanded vermiculite blended with calcium silicate include MOISS (a product name) manufactured by Mitsubishi Materials Kenzai Corporation, SARARIAET (a product name) manufactured by Daiken Corporation, ECOCARAT (a product name) manufactured by LIXIL Corporation (Inax), AG PLUS (a product name) manufactured by Nagoya Mosaic-Tile Co., Ltd., GAUDIA (a product name) manufactured by Sekisui Board Co., Ltd., and MONSIEUR (a product name) manufactured by Nikko Company.

In those cases where a humidity-conditioning construction material is used as an interior material, it is desirable that the surface of the humidity-conditioning construction material is decorated to enhance the decorative design characteristics, and a number of methods for decorating humidity-conditioning construction materials have already been proposed.

JP 2003-146775 A (Patent Document 1) discloses a technique for obtaining a construction material with excellent design characteristics by subjecting the surface of a humidity-conditioning construction material obtained by blending an unexpanded vermiculite with calcium silicate to a baking treatment.

JP 2011-26871 A (Patent Document 2) discloses a technique for decorating the surface of a humidity-conditioning construction material by using an inkjet recording device and an ultraviolet-curable ink to form an image on the surface of the material.

PRIOR ART DOCUMENTS

Non-Patent Documents

Non-Patent Document 1: Japan Construction Material & Housing Equipment Industries Federation, "Humidity-conditioning construction material standards relating to the humidity-conditioning construction material registration and certification system", established Oct. 1, 2007, revised Apr. 1, 2012, Internet URL: http://www.kensankyo.org/nintei/tyousitu/tyousitu_top.html Non-Patent Document 2: Humidity-Conditioning Construction Materials Performance Evaluation Committee, "Humidity-conditioning performance evaluation standards for humidity-conditioning construction materials" March 2006, Internet URL: http://www.jtccm.or.jp/main_services/seino/seino_jigyou_cyositu.html Patent Documents
  Patent Document 1: JP 2003-146775 A
  Patent Document 2: JP 2011-26871 A

SUMMARY OF THE INVENTION

Problems to be Solved by the Invention

However, the technique of Patent Document 1 requires the surface of the humidity-conditioning construction material to be heated at a high temperature during the baking treatment, and as a result, it is thought that some components contained within the construction material may undergo carbonization and turn black, meaning the color range of the product is narrow, with colorants having low tinting strength and covering power tending to darken, and therefore achieving a full-color image becomes difficult. Further, in the technique of Patent Document 1, the particle size of the colorants is large (from several thousand nm to several mm), and because it is considered that large amounts of colorants must be added, it is thought that the colorants may block a large number of pores, causing a significant deterioration in the humidity-conditioning performance.

In the technique of Patent Document 2, those portions to which the ultraviolet-curable ink has been adhered suffer from reduced humidity-conditioning performance, and therefore the surface area of the image must be restricted to not more than 1/3 of the total surface area of the porous base material. A plurality of the humidity-conditioning construction material panels are usually installed side by side, but if there is a limit on the surface area of the image, then generating a pattern that spans a plurality of the humidity-conditioning construction material panels is extremely difficult. Moreover, there is a possibility that uncured ultraviolet-curable ink may remain within the interior of the humidity-conditioning construction material, and therefore safety issues arise in relation to use of the material as an interior material, and potential adverse effects on people are also a concern. Further, materials with humidity-conditioning performance that can be used as humidity-conditioning construction materials may be used not only as construction materials, but also as coasters or foot mats or the like, and it is desirable that the decorative portion of these materials has water abrasion resistance of a level that presents no practical problems when used in a variety of products.

In this manner, conventionally, formation of a high-quality image with excellent water abrasion resistance on the surface of a humidity-conditioning construction material without impairing the humidity-conditioning performance has proven difficult.

An object of the present invention is to form a high-quality image with excellent water abrasion resistance on the surface of a humidity-conditioning base material that can be used in a humidity-conditioning construction material or the like without impairing the humidity-conditioning performance of the humidity-conditioning base material.

Means to Solve the Problems

As a result of intensive research aimed at achieving the above object, the inventors of the present invention discovered that by forming an image on the surface of a humidity-conditioning base material by inkjet printing using an aqueous inkjet ink containing a water-dispersible resin, the above object could be achieved, and they were therefore able to complete the present invention.

In other words, a first aspect of the present invention provides a method for producing a decorative article comprising a step of performing inkjet printing onto the surface of a humidity-conditioning base material using an aqueous inkjet ink containing at least water, a water-dispersible resin and a colorant.

Another aspect of the present invention provides a device for producing a decorative article, the device comprising at least a mounting section for mounting a humidity-conditioning base material, and an inkjet recording head disposed so as to enable inkjet printing by discharging an ink onto the surface of the humidity-conditioning base material, wherein an aqueous inkjet ink containing at least water, a water-dispersible resin and a colorant is used as the ink.

Yet another aspect of the present invention provides a decorative article comprising an image formed by inkjet printing on the surface of a humidity-conditioning base material, wherein the image is formed using an aqueous inkjet ink containing at least water, a water-dispersible resin and a colorant.

Effects of the Invention

In the present invention, because the surface of a humidity-conditioning base material is decorated by forming an image on the surface by an inkjet printing method using an aqueous inkjet ink containing a water-dispersible resin, the water-dispersible resin causes the colorant to bind favorably to the surface of the humidity-conditioning base material following printing, whereas the solvent component of the ink volatilizes, meaning blocking of the pores of the humidity-conditioning base material can be suppressed. As a result, a decorative image with excellent water abrasion resistance can be formed with superior quality across a broad area of the humidity-conditioning base material, without impairing the humidity-conditioning performance of the humidity-conditioning base material.

BRIEF DESCRIPTION OF THE DRAWINGS

FIG. 1 is a perspective view illustrating an outline of an embodiment of the decorating device.

EMBODIMENTS FOR CARRYING OUT THE INVENTION

Embodiments of the present invention are described below in detail, but the present invention is in no way limited by these embodiments, and various modifications and alterations are possible. In the present description, the terms "weight" and "mass" are deemed to have the same meaning, and the term "weight" is used below for the sake of consistency.

In the following description, the aqueous inkjet ink is sometimes described as simply "the ink" or "the aqueous ink", and the humidity-conditioning base material may be referred to as "the porous base material having a humidity-conditioning function" or simply "the porous base material".

In one embodiment of the present invention, when an aqueous inkjet ink is discharged onto a porous base material such as a humidity-conditioning construction material, the solvent component volatilizes, and the colorant (hereafter, the term "pigment" is sometimes used as a representative term for the colorant) and the water-dispersible resin, which generally have small particle sizes of several tens of nm to several hundred nm, can be fixed (or adhered) to the surface of the porous base material without blocking the surface pores, meaning color development can be achieved with a small amount of colorant, without impairing the humidity-conditioning performance. The humidity-conditioning performance is not particularly affected by the surface area of the image, and the grade for the humidity-conditioning construction material shown above in Table 1 does not fall following decoration, and can be maintained at the same grade as that prior to decoration. Specifically, even if the printed region of the image covers the entire surface of the porous base material, the humidity-conditioning construction material grade can be maintained. Further, because there are no restrictions on the recording surface area of the image, all manner of designs and text and the like can be produced with total freedom.

On the other hand, another technique that could be considered involves replacing the resin component in the aqueous inkjet ink with an anionic substance and incorporating a cationic substance in the porous base material, so that an ionic reaction (cation-anion reaction) can then be used to fix the pigment to the porous base material. However, in the case of porous base materials with considerable surface unevenness such as humidity-conditioning construction materials, fixation using only an ionic reaction (cation-anion reaction) tends to be weak, meaning the colorant needs to also be fixed physically using a resin.

In the present invention, because a water-dispersible resin is incorporated within the aqueous ink, the fixability of the colorant improves, and by adjusting the amount of the resin to a value within an appropriate range in a preferred embodiment, even more superior fixability of the colorant can be achieved. Accordingly, by using an aqueous ink containing a colorant which has a small average particle size and exhibits excellent coloration even in a small amount, the ink can be fixed favorably to the porous base material using only the physical fixation mentioned above, without blocking pores within the decorated porous base material. As a result, a decorative image having excellent water abrasion resistance can be formed on the porous base material without impairing the humidity-conditioning function of the porous base material.

Examples of the pores within the porous base material having a humidity-conditioning function include mesopores and macropores. Depending on the definitions used, finer pores than mesopores may be termed micropores, but in the present description, the term mesopores is deemed to include micropores. Mesopores have a diameter of about 1 to 50 nm, whereas macropores are pores with a diameter greater than 50 nm. Although there are no particular limitations on the upper limit for the diameter of macropores, pores in which the average diameter is not more than about 200 nm, or not more than about 100 nm (namely, greater than 50 nm but not more than 100 nm) are typical. These pores have a function of regulating the humidity by appropriately adsorbing and desorbing water molecules.

On the other hand, the water-dispersible resin contained in the ink is preferably a resin that forms a transparent coating and contributes to enhancing the gloss of the printed surface of the decorative article. Whereas the size of the pigment incorporated within the ink is typically an average particle size of about 60 nm to 200 nm, there are no particular limitations on the size of the water-dispersible resin, but in order to enhance binding between pigment particles, the resin particles are preferably smaller than the pigment particles. In one specific example of a preferred embodiment, when the average particle size of the pigment is about 80 nm to 100 nm, the size of the added water-dispersible resin, reported as an average primary particle size, is preferably (an average of) about 40 nm. If the primary particle size of the water-dispersible resin is increased, then there is a possibility that the ink dischargeability may deteriorate.

In the following description, the average primary particle size of the water-dispersible resin and other fine particles is sometimes referred to as simply "the primary particle size", and unless specifically stated otherwise, describes a value (median value) measured on a volumetric basis using a dynamic light scattering method. Apparatus such as the nanoparticle analyzer nano Partica SZ-100 (manufactured by Horiba, Ltd.) can be used as the dynamic light scattering particle size distribution measuring apparatus.

In one preferred embodiment, a pretreatment step of applying a pretreatment liquid containing at least water, a water-dispersible resin, and fine particles having a primary particle size of not more than 300 nm to the surface of the porous base material may be included prior to performing inkjet printing using the ink. The pretreatment liquid can be used favorably for reasons such as enhancing the gloss of the decorative portion.

In this pretreatment, highly water-adsorbent fine particles such as nano order silica block a portion of the large holes within the porous base material, thereby reducing the surface roughness Ra, but the fine particles do not completely block the pores within the porous base material, meaning there is no resulting deterioration in the humidity-conditioning properties. Further, because these fine particles can prevent components within the ink entering holes in the porous base material, the above pretreatment can, compared with the case where no pretreatment is performed, improve the smoothness of the surface of the porous base material, improve the dot uniformity of the image formed on the surface, and enable the gloss of the resins contained within the ink and the pretreatment liquid to manifest favorably. The types of effects obtained by this pretreatment cannot be achieved by simply polishing the surface of the porous base material to reduce the surface roughness Ra (the arithmetic average roughness).

In another preferred embodiment, the fine particles having a primary particle size of not more than 300 nm contained within the pretreatment liquid may be composed of a mixture of first fine particles having a primary particle size that is the same as or greater than the average primary particle size of the water-dispersible resin contained in the ink (namely, if the average primary particle size of the water-dispersible resin contained in the ink is deemed x nm, then a primary particle size of at least x nm but not more than 300 nm), and second fine particles having a primary particle size that is smaller than the average primary particle size of the water-dispersible resin contained in the ink. This enables an even better combination of gloss and humidity-conditioning properties to be obtained. The reason for this phenomenon is thought to be due to the factors described below, but the scope of the present invention is not constrained by the following theory.

The pigment particles typically adopt an aggregated form in the ink, and are therefore unlikely to enter the interior of either mesopores or macropores. In contrast, the water-dispersible resin in the ink is able to enter the mesopores and macropores. Even if the water-dispersible resin enters a macropore, because the size of the macropore is typically greater than that of the water-dispersible resin, there is little adverse effect on the aforementioned humidity-conditioning function. On the other hand, in the case of a mesopore, for example when the primary particle size of the water-dispersible resin is about 40 nm and the maximum diameter of the mesopore is about 50 nm, if the water-dispersible resin from the ink enters the mesopore, then it becomes blocked in the pore and may impair the humidity-conditioning function.

Consequently, in one embodiment, the pretreatment liquid preferably includes fine particles (first fine particles) having a size the same as or greater than the size of the water-dispersible resin in the ink, and other fine particles (second fine particles) that are smaller than the first fine particles, namely fine particles having a size that is smaller than that of the water-dispersible resin in the ink. As a result, at the surface of the porous base material, a state develops where the second fine particles exist in spaces between the first fine particles, thereby preventing the water-dispersible resin in the ink from entering the mesopores. This enables a better combination of gloss and humidity-conditioning properties to be obtained for the decorative article obtained following inkjet printing. This effect is particularly useful in those cases where the average primary particle size of the water-dispersible resin contained in the ink is smaller than the maximum diameter of the mesopores in the porous base material.

In one example, when a pretreatment liquid is used in combination with an ink in which the primary particle size of the water-dispersible resin is about 40 nm, then the pretreatment liquid preferably includes first fine particles having a primary particle size of at least 40 nm but not more than 300 nm, and second fine particles having a primary particle size of less than 40 nm.

In another preferred embodiment, a step of heating the porous base material may be included at a point at least after inkjet printing has been performed using the aqueous ink. The heating temperature is preferably from 50 to 100° C.

1. Aqueous Inkjet Ink

The aqueous inkjet ink used in the present invention comprises at least water, a water-dispersible resin and a colorant, and may also include other components as necessary. In other words, this ink is prepared so as to be particularly ideal for use on humidity-conditioning base materials (for example, humidity-conditioning construction materials).

1-1. Water

There are no particular limitations on the water, provided it can function as a solvent, namely a vehicle, for the ink, and tap water, ion-exchanged water, or deionized water or the like can be used. Water is a highly volatile solvent, and readily evaporates following discharge onto the porous base material, and therefore blocking of the pores of the porous base material following decoration can be prevented, and any deterioration in the humidity-conditioning performance of the decorated porous base material can also be prevented. Further, water is also non-toxic and extremely safe, and does not have the problems associated with VOCs and the like, meaning the decorated porous base material (decorative article) is very environmentally friendly.

The larger the water content in the ink, the greater the effect in preventing deterioration in the humidity-conditioning performance of the porous base material, and therefore the water content is preferably at least 60% by weight, and more preferably 65% by weight or more, of the total weight of the ink. Further, the water content is preferably not more than 95% by weight, and more preferably 90% by weight or less.

The ink solvent is preferably composed almost entirely of water, but may also include water-miscible (water-soluble) organic solvents as necessary. Examples of these water-miscible organic solvents include glycol-based solvents, glycol ethers, acetates of glycol ethers, lower alcohols having a carbon number of 1 to 6, glycerol, diglycerol, triglycerol, polyglycerol, imidazolidinone-based solvents and 3-methyl-2,4-pentanediol. These organic solvents may be used individually, or a mixture containing two or more solvents may be used, provided the solvents form a single phase.

From the viewpoints of viscosity regulation and moisture retention, the amount of water-miscible organic solvents is preferably not more than 30% by weight of the ink (or not more than 50% by weight of the solvent).

1-2. Colorant

Both pigments and dyes can be used as the colorant, and the pigments and dyes may be used separately, or the two may be combined. From the viewpoints of the weather resistance and print density of the decorative image, a pigment is preferably used as the colorant.

The colorant is preferably added in an amount within a range from 0.01 to 20% by weight relative to the total weight of the ink. Further, the amount of the colorant relative to the total weight of the ink is more preferably at least 0.1% by weight, still more preferably at least 0.5% by weight, and most preferably 1% by weight or greater. Moreover, the amount of the colorant relative to the total weight of the ink is more preferably not more than 15% by weight, still more preferably not more than 10% by weight, and most preferably 8% by weight or less.

1-2-1. Dyes

Any of the dyes typically used in the technical field of printing may be used without any particular limitations. Specific examples include basic dyes, acid dyes, direct dyes, soluble vat dyes, acid mordant dyes, mordant dyes, reactive dyes, vat dyes and sulfide dyes, and among these, water-soluble dyes and dyes that become soluble upon reduction or the like can be used. More specific examples of dyes that may be used include azo dyes, rhodamine dyes, methine dyes, azomethine dyes, xanthene dyes, quinone dyes, triphenylmethane dyes, diphenylmethane dyes, and methylene blue. These dyes may be used individually, or a combination of two or more dyes may be used.

1-2-2. Pigments

Any of the pigments typically used in the technical fields of printing and coating materials may be used without any particular limitations, including both organic pigments and inorganic pigments, but in terms of the tinting strength relative to the porous base material, organic pigments and carbon blacks are preferred. Specific examples of such organic pigments and carbon blacks include Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180 and 185; Pigment Orange 16, 36, 38, 43, 51, 55, 59, 61, 64, 65 and 71; Pigment Red 9, 48, 49, 52, 53, 57, 97, 122, 149, 168, 177, 178, 179, 206, 207, 209, 242, 254 and 255; Pigment Violet 19, 23, 29, 30, 37, 40 and 50; Pigment Blue 15, 15:1, 15:3, 15:4, 15:6, 22, 30, 64 and 80; Pigment Green 7 (chlorinated phthalocyanine green) and 36 (brominated phthalocyanine green); Pigment Brown 23, 25 and 26; and Pigment Black 7 (carbon black), 26, 27 and 28.

Specific examples of the organic pigments include LIONOL BLUE FG-7400G (a phthalocyanine pigment, manufactured by Toyo Ink Mfg. Co., Ltd.), YELLOW PIGMENT E4GN (an azo nickel complex pigment, manufactured by Bayer AG), CROMOPHTAL PINK PT (a quinacridone pigment, manufactured by BASF Corporation), ELFTEX 415 (a carbon black, manufactured by Cabot Corporation), FASTOGEN SUPER MAGENTA RG (a quinacridone pigment, manufactured by DIC Corporation), YELLOW PIGMENT E4GN (an azo nickel complex pigment, manufactured by Lanxess AG), IRGALITE BLUE 8700 (a phthalocyanine pigment, manufactured by BASF Corporation), and E4GN-GT (an azo nickel complex pigment, manufactured by Lanxess AG). A specific example of carbon black is MONARCH 1000 (manufactured by Cabot Corporation). These pigments may be used individually, or a combination of two or more pigments may be used.

1-2-3. Pigment Dispersants

In order to improve the dispersion of the pigment within the ink, a pigment dispersant may be added to the ink as necessary. There are no particular limitations on the types of pigment dispersants that may be used, provided they are capable of stably dispersing the pigment within the solvent, and the use of conventional pigment dispersants typified by polymeric dispersants and surfactants is preferable. Specific examples of the polymeric dispersants include the SOLSPERSEe (product name) series manufactured by Lubrizol Japan Ltd., and the JONCRYL (product name) series manufactured by Johnson Polymer, Inc. Specific examples of the surfactants include the DEMOL (product name) series manufactured by Kao Corporation.

The amount of the pigment dispersant need only be sufficient to enable satisfactory dispersion of the pigment within the aforementioned solvent, and can typically be set to a weight ratio within a range from 0.01 to 2 relative to a value of 1 for the pigment.

1-3. Water-Dispersible Resin

In order to ensure satisfactory fixation of the colorant to the porous base material having a humidity-conditioning function, a water-dispersible resin must be added to the ink. Representative examples of water-dispersible resins that can be used include aqueous resin emulsions, and particularly oil-in-water (O/W) resin emulsions. The resin used in forming the aqueous resin emulsion is preferably a resin that forms a transparent coating, and examples of the resin include ethylene-vinyl chloride copolymer resin emulsions, acrylic resin emulsions, styrene-maleic anhydride copolymer resin emulsions, urethane resin emulsions, vinyl acetate-acrylic copolymer resin emulsions, and vinyl acetate-ethylene copolymer resin emulsions.

Among these aqueous resin emulsions, from the viewpoints of achieving stable discharge performance from the inkjet head, and achieving good adhesion to the inorganic porous materials such as diatomaceous earth, vermiculite, kaolinite, gypsum, tile chamotte, slaked lime and ceramic porous powders which are used as the raw material for the porous base material such as the humidity-conditioning construction material, a urethane resin emulsion having a glass transition temperature (Tg) of −35 to 10° C. is preferable. Specific examples of such aqueous resin emulsions include SUPERFLEX 460, 460S, 470, 610, 700, 170 and 840 (all product names) manufactured by DKS Co., Ltd.

The water-dispersible resin may be composed of a single resin emulsion such as a urethane resin emulsion, or may be composed of a combination of a plurality of different resin emulsions.

Although there are no particular limitations on the size of the water-dispersible resin particles, the primary particle size is preferably at least 5 nm, and more preferably 10 nm or greater. On the other hand, the size of the water-dispersible resin is preferably smaller than that of the pigment, and is therefore preferably not more than 150 nm, more preferably not more than 130 nm, still more preferably not more than 100 nm, and most preferably 80 nm or less.

The amount (solid fraction amount) of the water-dispersible resin within the ink, reported as a ratio between the colorant and the water-dispersible resin (colorant : water-dispersible resin), is preferably within a range from 1:0.5 to 1:7 (weight ratio). By ensuring that the amount of the water-dispersible resin satisfies this range, good water abrasion resistance and high image quality can be achieved for the image printed on the surface of the porous base material. If the amount of the water-dispersible resin is less than 0.5 relative to a value of 1 for the colorant, then there is a possibility that the fixability of the pigment may deteriorate, whereas if the amount is greater than 7, then the viscosity increases, and there is a possibility that the ink may not be able to be discharged satisfactorily from the ink discharge head.

1-4. Other Components

Components other than those described above may also be added to the ink, provided they have no adverse effects on the properties of the ink, and examples of these other components include humectants, surface tension modifiers (such as surfactants), antifoaming agents, pH modifiers, antioxidants and preservatives.

1-5. Method for Producing Aqueous Inkjet Ink

There are no particular limitations on the method used for producing the ink, and appropriate conventional methods may be used. For example, the ink can be prepared by dispersing all of the components in a conventional dispersion device such as a beads mill, either in a single batch or in a number of separate batches, and then, if desired, passing the resulting dispersion through a conventional filtration device such as a membrane filter. For example, the ink can be prepared by first preparing a mixed liquid by uniformly mixing the total amounts of water and the colorant in advance, dispersing this mixed liquid using a dispersion device, subsequently adding the remaining components to the dispersion, and then passing the resulting dispersion through a filtration device.

2. Pretreatment Liquid

During production of the decorative article, before the aforementioned aqueous ink is used to perform inkjet printing onto the surface of the porous base material, the surface of the porous base material is preferably pretreated with a pretreatment liquid. By performing a pretreatment, the color development and gloss of the portions decorated with the ink can be enhanced. Particularly in the case of porous base materials having a low amount of moisture adsorption and desorption and/or a low average moisture content, such as humidity-conditioning construction materials having inferior humidity-conditioning properties and having a low grade as prescribed in JIS A 1470-1 (2002) and/or JIS A 1475 (2004), although a high level of color development can be achieved with even a small amount of ink, if the amount of ink applied per unit of time is increased, then there is a possibility that ink overflow may occur, increasing the likelihood of image bleeding and ink accumulation, with this ink accumulation not only causing a deterioration in the image quality, but also blocking a portion of the pores within the porous base material, resulting in a deterioration in the humidity-conditioning performance. In such cases, a pretreatment is preferably performed by applying and then drying an aforementioned pretreatment liquid on the surface of the porous base material prior to printing.

The pretreatment liquid comprises at least water, a water-dispersible resin, and fine particles having a primary particle size of not more than 300 nm, and may also include other optional components.

2-1. Water

In the pretreatment liquid, the water functions as the solvent for the pretreatment liquid, and the description of the water provided above in relation to the ink also applies to the pretreatment liquid water. Similarly, the solvent for the pretreatment liquid may also include a water-miscible organic solvent described above in addition to the water.

2-2. Fine Particles Having Primary Particle Size of Not More Than 300 nm

There are no particular limitations on the fine particles, provided they have a primary particle size of not more than 300 nm. If the primary particle size of the fine particles exceeds 300 nm, then a state is obtained where the fine particles sit on the surface of the porous base material, and therefore the water abrasion resistance of the decorative image deteriorates, or the transparency of the treated portions deteriorates, resulting in a noticeable difference in the external appearance of the pretreated portions and the non-pretreated portions, which is also undesirable.

The amount (solid fraction amount) of the fine particles in the pretreatment liquid is preferably at least 0.8% by weight, and more preferably 1.3% by weight or greater, but is preferably not more than 6.0% by weight, and more preferably 5.4% by weight or less.

In order to further enhance the gloss of the decorative image, the fine particles having a primary particle size of not more than 300 nm are preferably composed of a combination of first fine particles having a primary particle size that is the same as or greater than the primary particle size of the water-dispersible resin in the ink, and second fine particles having a primary particle size that is smaller than the primary particle size of the water-dispersible resin in the ink.

Specifically, the fine particles are, for example, preferably composed of a mixture of first fine particles of large particle size having a primary particle size of at least 30 nm but not more than 300 nm, and second fine particles of small particle size having a primary particle size of less than 30 nm. In those cases where the primary particle size of the water-dispersible resin contained in the ink is smaller than the maximum diameter of the mesopores in the porous base material, the use of a combination of fine particles of large particle size and fine particles of small particle size is particularly preferred. Moreover, fine particles composed of a mixture of first fine particles of large particle size having a primary particle size of at least 40 nm but not more than 300 nm, and second fine particles of small particle size having a primary particle size of less than 40 nm are also desirable.

These types of mixtures may have bimodal particle size distributions having peaks in a region where the primary particle size is less than 30 nm (or 40 nm), and a region where the primary particle size is between 30 nm (or 40 nm) and 300 nm. From the viewpoint of the gloss of the decorative portion, the blend ratio of the first fine particles relative to a total value of 100% by weight for the combination of the first fine particles and the second fine particles is preferably within a range from 5 to 95% by weight, more preferably from 15 to 95% by weight, and most preferably from 50 to 95% by weight.

If the aforementioned fine particles are composed only of the first fine particles, then as described below in Example 2, the gloss improves compared with the case where no pretreatment is performed, but although the fine particles accumulate on the surface of the porous base material, gaps are formed between the fine particles that permit the passage of the water-dispersible resin from the ink, meaning that the water-dispersible resin from the ink is still able to enter the mesopores, resulting in a slightly inferior improvement in the gloss. On the other hand, if the fine particles are composed only of the second fine particles, then as described below in Example 8, the gloss improves compared with the case where no pretreatment is performed, but although the types of gaps described above are not formed between the fine particles accumulated on the porous base material, the fine particles themselves are able to enter the mesopores, resulting in a slightly inferior improvement in the gloss.

In contrast, if, as described above, the fine particles are composed of first fine particles having a primary particle size of, for example, at least 40 nm but not more than 300 nm, and second fine particles having a primary particle size of, for example, less than 40 nm, then as described below in Example 6, the improvement in the gloss is excellent, and this configuration is useful in those cases where the primary particle size of the water-dispersible resin contained in the ink is smaller than the maximum diameter of the aforementioned mesopores, and particularly when the primary particle size of the water-dispersible resin contained in the ink is about 40 nm. In a separate embodiment, for example when the primary particle size of the water-dispersible resin contained in the ink is about 25 nm to 30 nm, the fine particles are preferably composed of first fine particles having a primary particle size of at least 30 nm but not more than 300 nm, and second fine particles having a primary particle size of less than 30 nm.

Inorganic fine particles can be used favorably as the fine particles. Specific examples include silica fine particles, vermiculite, calcium carbonate and alumina, and among these, silica fine particles are preferred. Further, extenders such as talc, diatomaceous earth, calcium carbonate, barium carbonate, barium sulfate, alumina white, silica, kaolin, mica, acid clay, activated clay and bentonite can also be used favorably. Combinations containing a plurality of these fine particles may also be used.

2-3. Water-Dispersible Resin

In the pretreatment liquid, the water-dispersible resin is added to ensure satisfactory fixation to the porous base material of the aforementioned fine particles having a primary particle size of not more than 300 nm. There are no particular limitations on the water-dispersible resin, provided the resin exhibits water resistance and adhesion to the porous base material, and specific examples of resins that may be used include the various water-dispersible resins described above in relation to the ink. A combination of a plurality of water-dispersible resins may also be used.

The amount of the water-dispersible resin within the pretreatment liquid, reported as a ratio between the fine particles and the water-dispersible resin (namely, fine particles : water-dispersible resin), is preferably within a range from 15:1 to 25:1 (weight ratio). By ensuring that the amount of the water-dispersible resin satisfies this range, the fine particles can be fixed satisfactorily to the porous base material.

Although there are no particular limitations on the primary particle size of the water-dispersible resin in the pretreatment liquid, in one embodiment, the primary particle size is preferably greater than the diameter of the mesopores in the porous base material that is to be decorated, and more specifically, is preferably greater than 40 nm, more preferably 45 nm or greater, still more preferably 80 nm or greater, and most preferably 150 nm or greater. Because the water-dispersible resin contained in the pretreatment liquid is required to achieve favorable binding between the fine particles and between the fine particles and the porous base material, without entering the mesopores of the porous base material, the primary particle size of the water-dispersible resin contained in the pretreatment liquid is preferably larger than the diameter of the aforementioned mesopores.

The amount of the water-dispersible resin contained in the pretreatment liquid is preferably less than the amount of the water-dispersible resin in the ink.

In the ink or the pretreatment liquid, a configuration in which the fine particles and the water-dispersible resin exist as independent fine particles and a configuration in which the fine particles exist in the form of clustered aggregates are possible, but as mentioned above, in the present invention, the primary particle size means the particle size (median size) measured by a dynamic light scattering method.

2-4. Other Components

Components other than those described above may also be added to the pretreatment liquid, provided they have no adverse effects on the properties of the pretreatment liquid, and examples of these other components include humectants, antifoaming agents, pH modifiers, antioxidants and preservatives.

2-5. Method for Preparing Pretreatment Liquid

The pretreatment liquid can be prepared, for example, by dispersing all of the components, including the water, the water-dispersible resin and the fine particles having a primary particle size of not more than 300 nm, in a conventional dispersion device such as a beads mill, either in a single batch or in a number of separate batches, and then, if desired, passing the resulting dispersion through a conventional filtration device such as a membrane filter. For example, the pretreatment liquid can be prepared by first preparing a mixed liquid by uniformly mixing the total amounts of water and the fine particles in advance, dispersing this mixed liquid using a dispersion device, subsequently adding the remaining components to the dispersion, and then passing the resulting dispersion through a filtration device.

3. Method for Producing Decorative Article (Decoration Method)

Production of the decorative article, namely the article obtained by decorating the surface of the humidity-conditioning base material, is performed by printing an image onto the surface of the humidity-conditioning base material by an inkjet printing method using the ink described above.

The humidity-conditioning base material is preferably a base material having humidity-conditioning performance that satisfies at least grade 1 prescribed for humidity-conditioning construction materials (see Table 1 above). Specifically, the use of a base material that exhibits an amount of moisture adsorption, measured after 3 hours in accordance with JIS A 1470-1 (2002) (or ISO 24353: 2008), that is greater than 15 $g/m^2$ is preferred. Further, the decorative article obtained following the inkjet printing preferably also has humidity-conditioning performance that satisfies at least grade 1 prescribed for humidity-conditioning construction materials, and more specifically, preferably exhibits an amount of moisture adsorption, measured after 3 hours in accordance with JIS A 1470-1 (2002) (or ISO 24353: 2008), that is greater than 15 $g/m^2$.

By performing the pretreatment step of applying and then drying the aforementioned pretreatment liquid on the surface of the porous base material, prior to performing inkjet printing, the color development and gloss of the image subsequently printed onto the base material by inkjet printing can be improved.

The application of the pretreatment liquid to the surface of the porous base material may be performed by using a brush, roller, bar coater, air knife coater, or sprayer or the like to uniformly coat the surface of the porous base material, or a printing technique such as inkjet printing, gravure printing or flexographic printing may be used to print an image using the pretreatment liquid. In other words, the pretreatment liquid may be applied across the entire surface of the porous base material, or may be applied only to those locations that are required, for example only to those locations onto which inkjet printing is to be performed using the aforementioned ink.

The coating amount of the pretreatment liquid differs depending on the amount of moisture adsorption and desorption and the average moisture content of the porous base material, but in order to achieve a certain level of color development and gloss for the decorative image, the coating amount (solid fraction) is preferably increased for porous base materials having a lower amount of moisture adsorption and desorption and a lower average moisture content. Further, in the case of a porous base material having a surface roughness Ra of about 15 μm, applying a sufficient amount of the pretreatment liquid to achieve an Ra value following the pretreatment of not more than 10 μm, and preferably not more than 8 μm, is desirable in terms of improving the color development and the gloss of the printed image. On the other hand, even if the surface roughness of the porous base material is improved by polishing or the like prior to the pretreatment, there is almost no effect on the pore structure of the base material, and in those cases where the porous base material is to be subjected to a pretreatment with the pretreatment liquid, if the surface is polished or the like prior to the pretreatment to reduce the surface roughness to a value that is preferably not more than 10 μm, and more preferably 8 μm or less, and the pretreatment and subsequent inkjet printing are then performed on the polished surface, then the color development and gloss of the printed image can be improved even further. The surface roughness Ra can be measured using a Laser Scanning Microscope VK-8700 manufactured by Keyence Corporation or the like. During measurement, specific portions such as areas of large surface unevenness or recesses within the porous base material may be excluded.

As mentioned above, the ideal coating amount for the pretreatment liquid differs depending on the humidity-conditioning performance of the porous base material, and can therefore not be uniformly specified, but the solid fraction amount per unit of coated surface area may be set, for example, to about 15 $g/m^2$ to 30 $g/m^2$ in the case of a grade 1 humidity-conditioning construction material, to about 5 $g/m^2$ to 15 $g/m^2$ in the case of a grade 2 humidity-conditioning construction material, and to about 3 $g/m^2$ to 10 $g/m^2$ in the case of a grade 3 humidity-conditioning construction material.

Regardless of whether or not a pretreatment is performed, printing conditions which are useful in obtaining a high-quality decorative image include (i) reducing the size of the ink drops, (ii) reducing the printing speed, (iii) performing unidirectional printing, (iv) performing printing while warming the porous base material, (v) lowering the print resolution, or (vi) using a combination of these printing methods. Particularly in the case of a porous base material that exhibits a low amount of moisture adsorption and desorption and/or a low average moisture content, such as a humidity-conditioning construction material having relatively poor humidity-conditioning properties, and having a low grade as prescribed in the aforementioned humidity-conditioning performance evaluation standards for humidity-conditioning construction materials (for example, a humidity-conditioning construction material of the aforementioned grade 1), bleeding of the image or ink accumulation is likely to occur if a pretreatment is not performed, but by employing the methods described above, image bleeding and ink accumulation can be avoided even if a pretreatment is not conducted.

The printing condition described above in which printing is performed while warming the porous base material is also very effective, regardless of the performance of the porous base material, in those cases where it is necessary to obtain an image of high color development using a small amount of ink, and in those cases where it is desirable to perform uniform printing of a pattern on a porous base material having significant surface unevenness or across a plurality of porous base materials having different ink adsorption performance. By performing printing while warming the porous base material, the components besides water within the ink, such as the pigment, can be formed in positions close to the surface of the porous base material, and therefore the effect on the humidity-conditioning performance and the shape of the porous base material can be minimized, and a stable image can be obtained.

Examples of the method used for warming the porous base material include a method in which the porous base material is heated with a heater until immediately prior to printing, so that the residual heat warms the porous base material during printing, a method in which a sheet-like heater is disposed beneath the porous base material, enabling printing to be performed while the base material is warmed, and a method that uses a combination of these methods. Examples of the heater include ceramic heaters, carbon heaters, and heaters that emit infrared radiation such as a sheath heater that has been subjected to a surface treatment to facilitate the emission of infrared radiation. There are no particular limitations on the heating temperature of the porous base material, provided that the nozzles used for the inkjet printing do not dry out, making the ink discharge unstable.

Following completion of the printing, the porous base material may be subjected to a heating step at a temperature within a range from 50 to 100° C., and the heating method employed may be the same type of method as that mentioned above for use prior to printing or during printing. By heating the porous base material in this manner, the water and other volatile components in the ink can be volatilized completely, while the colorant in the ink can be fixed to the porous base material by the water-dispersible resin.

There are no particular limitations on the porous base material having a humidity-conditioning function used for producing the decorative article, provided that the material has a multitude of pores in the surface, and these pores exhibit moisture adsorption and desorption properties. As mentioned above, the use of a base material having a humidity-conditioning function that satisfies at least grade 1 prescribed for humidity-conditioning construction materials is preferable (see Table 1 above). The shape of the porous base material is typically a board shape, namely a sheet-like shape, but is not limited to such shapes.

The diameters of the pores in this porous base material having a humidity-conditioning function are typically from about 1 to 200 nm or about 1 to 100 nm, and more specifically, typically include mesopores having a diameter of 1 to 50 nm and macropores having a diameter exceeding 50 nm (for example, a diameter exceeding 50 nm but not more than 200 nm, or a diameter exceeding 50 nm but not more than 100 nm). The diameter of the mesopores can be measured, for example, by the mercury penetration method using a mercury porosimeter.

Representative examples of the porous base material include hardened bodies of inorganic materials such as calcium silicate, and examples include materials containing inorganic powders having moisture adsorption and desorption capabilities such as silicate powders, silica gel, diatomaceous earth, activated clay, zeolite, bentonite, montmorillonite and sepiolite, as well as materials obtained by additional firing of these hardened bodies. Specific examples of the porous base material include the types of materials used for humidity-conditioning construction materials and the like, and humidity-conditioning construction materials that have been registered with the Japan Construction Material & Housing Equipment Industries Federation are preferred. In other words, humidity-conditioning construction materials having performance levels that satisfy the humidity-conditioning performance evaluation standards listed above in Table 1 can be used particularly favorably. As mentioned above, specific examples of such materials include porous base materials that exhibit an amount of moisture adsorption, measured after 3 hours in accordance with JIS A 1470-1 (2002), that is greater than 15 g/m$^2$.

Examples of such humidity-conditioning construction materials include humidity-conditioning construction materials disclosed in JP 2003-146775 A, obtained by molding one or more hydrophilic materials selected from among gypsum, calcium silicate, cement, gypsum slag and basic magnesium carbonate, humidity-conditioning construction materials obtained by molding a material prepared by adding expanding and/or releasing minerals to one or more of the above hydrophilic materials, and humidity-conditioning construction materials such as those disclosed in JP 2002-4447 A, produced by a carbon dioxide hardening reaction of a molded body containing calcium carbonate and amorphous silica as the main components. Humidity-conditioning construction materials obtained by molding a material containing unexpanded vermiculite blended with calcium silicate, such as the materials disclosed in JP 2003-146775 A, can be used particularly favorably as the porous base material.

Inkjet printing to the above porous base material using the aqueous ink can be performed using a typical recording head, and there are no particular limitations on the printing method or the apparatus that is used. By performing drying following the printing (decoration), the water and other volatile components are volatilized from the ink that has been inkjet printed onto the surface of the porous base material, and a decorative article, and in particular a decorative construction material, having humidity-conditioning performance is obtained which includes an image composed mainly of the water-dispersible resin and the colorant. The image on the decorative article may also include, in addition to the water-dispersible resin and the colorant, small amounts of non-volatile components derived from the ink such as surfactants.

In the case of humidity-conditioning construction materials produced by a carbon dioxide hardening reaction, such as the materials disclosed in JP 2002-4447 A, the materials are usually produced via a series of steps comprising: material mixing→press molding→carbon dioxide gas hardening (exothermic)→drying, and the decoration step is then performed on the carbon dioxide gas-hardened body, specifically by a series of steps comprising: carbon dioxide gas-hardened body→decorative printing→heating→natural cooling (completion). In one embodiment, the decoration can be performed on the humidity-conditioning construction material, namely on the carbon dioxide gas-hardened body, but in another embodiment, the decoration can be performed on the molded article obtained following press molding but prior to the carbon dioxide gas hardening. In the latter case, the decorative construction material can be produced via the steps of: material mixing→press molding→decorative printing→carbon dioxide gas hardening (exothermic)→drying (completion), meaning the heat from the carbon dioxide gas hardening step and the drying step can be used to assist the volatilization of the water and other volatile components within the ink. This offers the advantages that the energy consumption can be kept low, the steps can be shortened, and inventory stock of the material prior to decoration becomes unnecessary.

4. Device for Producing Decorative Article (Decorating Device)

The decorating device comprises at least a mounting section for mounting the humidity-conditioning base material, and an inkjet recording head disposed so as to enable inkjet printing by discharging an ink onto the surface of the humidity-conditioning base material.

In another embodiment, the decorating device comprises at least a mounting section for mounting the humidity-conditioning base material, a pretreatment liquid coating section for applying a pretreatment liquid to the surface of the humidity-conditioning base material, and an inkjet recording head disposed so as to enable inkjet printing by discharging an ink onto the surface of the humidity-conditioning base material that has been coated with the pretreatment liquid.

FIG. 1 is a perspective view outline illustrating one example of the decorating device used for producing the decorative article. The decorating device comprises an input section (not shown in the figure, for example a scanner) for providing the electronic data (containing a pixel value for each of the pixels) for the decorative image that is to be formed, a recording head section 10 which records an image by discharging aqueous inks onto the surface of the porous base material 1, a transport section 20 which, with the porous base material 1 in a mounted state, transports the porous base material 1 to a location opposing the discharge nozzles formed on the lower surface of the recording head section 10, and a pretreatment liquid coating section 30 which, prior to the porous base material 1 reaching the recording head section 10, discharges the pretreatment liquid onto the surface of the porous base material 1, thereby coating the porous base material with the pretreatment liquid. Further, in the example shown in the figure, the decorating device also comprises a heating section 40 disposed between a pair of rollers 21 provided within the transport section 20, and this heating section warms the porous base material 1 during printing and before and after printing, thereby heating the decorative region on the porous base material 1 and accelerating the drying of the discharged pretreatment liquid and ink. The heating section 40 may be a ceramic heater, a carbon heater, or a heater that emits infrared radiation. The transport section 20 is the structure that corresponds with the mounting section described in the claims of the present invention, and in this example, transports the porous base material 1 in the direction of the arrow Y shown in the figure.

Further, the decorating device has a base material setting section (not shown in the figure) and a base material receiving section (not shown in the figure) provided at the two ends of the transport section 20, wherein the base material setting section feeds the porous base material 1 onto the transport section 20, and the base material receiving section receives the transported porous base material 1 from the transport section 20. Furthermore, the decorating device also comprises a control unit (not shown in the figure) which controls each of the sections.

The recording head section 10 shown in the figure is a line head (full-line type inkjet recording head) having a plurality of nozzles arranged in a single line across the entire width of an image formation region in a main scanning direction that is orthogonal to the sub-scanning direction Y (the transport direction) of the porous base material 1, and has a series of head units 10Y, 10M, 10C and 10K which discharge inks of different colors (yellow, magenta, cyan and black respectively) along the sub-scanning direction Y.

There are no particular limitations on the ink discharge method employed by the recording head section 10, and examples of methods that may be used include continuous methods such as a charge modulation method, microdot method, charge injection control method or ink mist method, and on-demand methods such as the Stemme method, pulse jet method, bubble jet (a registered trademark) method or electrostatic attraction method. The recording head shown in the figure is a line head, but a serial head may also be used. Further, the head unit is not limited to a head that discharges the four colored inks described above, and a head that also discharges other colors (such as light magenta, light cyan or red) may also be used.

The pretreatment liquid coating section 30 is a line head having a plurality of nozzles arranged in a single line across the entire width of the image formation region in the main scanning direction that is orthogonal to the sub-scanning direction Y (the transport direction) of the porous base material 1, and discharges the pretreatment liquid using an inkjet method.

The transport section 20 shown in the figure comprises an endless conveyor belt 22 stretched around the pair of rollers 21, and by rotationally driving the rollers 21, the porous base material 1 mounted on the conveyor belt 22 is moved in the sub-scanning direction Y, enabling an image to be printed across the entire surface of the porous base material 1.

Next is a description of the operation of the decorating device. When the surface of the porous base material 1 is to be decorated, first, the user sets the porous base material 1 on the base material setting section, and captures the original image via the input section formed from a scanner or the like, thus inputting the data for the decorative image. The control unit controls the base material setting section and the transport section 20, thereby moving the porous base material 1 continuously along the sub-scanning direction Y, and also controls the heating section 40, thereby heating the transport section 20. Based on control instructions from the control unit, the pretreatment liquid coating section 30 discharges the pretreatment liquid and coats a prescribed region (an image formation region based on the image data) of the transported porous base material 1. The control unit controls the driving of the transport section 20 and the recording head section 10 based on the image data, and by discharging the inks onto positions on the porous base material corresponding with each of the pixels, performs image recording on the surface of the porous base material 1.

This embodiment is configured so that the porous base material 1 can be heated during application of the pretreatment liquid, during ink discharge from the recording head, and also after the ink discharge, and although it is preferable that heating is applied at least after the ink discharge from the recording head, the device may be configured so that heating before the ink discharge and during the ink discharge may also be performed as required. The heating before the ink discharge and during the ink discharge may be performed in those cases where a low-grade humidity-conditioning construction material is being decorated, a plurality of humidity-conditioning construction materials having different grades are being decorated simultaneously, or when a humidity-conditioning construction material having severe surface unevenness is being decorated.

Further, a heating device that heats the porous base material 1 from above may be provided, either in addition to the heating device 40 or instead of the heating device 40.

5. Method for Decorating Porous Base Material

The method for decorating a porous base material comprises a step of performing inkjet printing on the surface of a porous base material having a humidity-conditioning function using an aqueous inkjet ink containing at least water, a water-dispersible resin and a colorant.

In one embodiment, the decoration method preferably also includes, prior to the inkjet printing step, a pretreatment step of applying a pretreatment liquid containing at least water, a water-dispersible resin, and fine particles having a primary particle size of not more than 300 nm to the surface of the porous base material.

In this method for decorating a porous base material, the same materials as those described above in the method for producing a decorative article can be used favorably for the porous base material, the ink, and the pretreatment liquid and the like.

6. Decorative Article

The decorative article comprises an image containing a water-dispersible resin and a colorant formed on the surface of a humidity-conditioning base material by inkjet printing (namely, a humidity-conditioning decorative article). An ink containing a water-dispersible resin having an average primary particle size of at least 5 nm but not more than 150 nm is used as the ink.

The humidity-conditioning base material may use the same type of material as that described above in "3. Method for Producing Decorative Article". For example, humidity-conditioning construction materials can be used favorably, but the decorative article may also be used for purposes other than construction materials, such as for coasters or foot mats or the like.

The decorative article obtained following inkjet printing preferably has humidity-conditioning performance that satisfies at least grade 1 prescribed for humidity-conditioning construction materials, and as described above, preferably exhibits an amount of moisture adsorption, measured after 3 hours in accordance with JIS A 1470-1 (2002), that is greater than 15 g/m$^2$.

The image formed by inkjet printing is preferably formed on the surface of a porous base material that has been surface treated in advance with a prescribed pretreatment liquid, namely coated with a pretreatment liquid. This pretreatment liquid is the same as that described above in the method for producing a decorative article. There are no particular limitations on the recording surface area of the image, and any arbitrary pattern, text, or combination of pattern and text can be freely selected.

EXAMPLES

The present invention is described below in further detail using a series of examples and reference examples (hereafter referred to as "comparative examples"), but the present invention is in no way limited by these examples.

Examples 1 to 17, Comparative Examples 1 to 4

(1) Preparation of Aqueous Inks

The components shown in Table 2 were mixed together in the proportions shown in Table 2 using a homogenizer, and the obtained dispersions were each filtered through a membrane filter (pore size: 3 μm), thus yielding a series of aqueous inks 1. Further, with the exception of replacing the water-dispersible resin with a water-soluble resin (polyvinyl alcohol) having a polymerization degree of 300 and a saponification degree of 87 to 89 mol %, aqueous inks 2 were also prepared in the same manner.

TABLE 2

| | | Aqueous Inks 1 | | | | | |
|---|---|---|---|---|---|---|---|
| | | Ink color | | | | | |
| | | C (wt %) | M (wt %) | K (wt %) | Y (wt %) | Lc (wt %) | Lm (wt %) |
| Pigment dispersion (solid fraction) | CAB-O-JET 250C | 6 | | | | 0.9 | |
| | CAB-O-JET 260M | | 6 | | | | 0.9 |
| | CW-2 | | | 6 | | | |
| | CAB-O-JET 270Y | | | | 6 | | |
| Water-dispersible resin (solid fraction) | SUPERFLEX 460 | 4.5 | 4.5 | 4.5 | 2.3 | 4.9 | 4.9 |
| Surfactant (solid fraction) | SURFYNOL 465 | 3 | 3 | 3 | 3 | 3 | 3 |
| Water-miscible organic solvent | Glycerol | 20 | 20 | 20 | 20 | 20 | 20 |
| | Water | 66.5 | 66.5 | 66.5 | 68.7 | 71.2 | 71.2 |
| | Total (wt %) | 100 | 100 | 100 | 100 | 100 | 100 |
| | Pigment:water-dispersible resin | 1:1 | 1:1 | 1:1 | 1:0.5 | 1:7 | 1:7 |

C: cyan,
M: magenta,
K: black,
Y: yellow,
Lm: light magenta,
Lc: Light cyan
In Table 2, the various product names have the meanings shown below.
CAB-O-JET 250C: a cyan pigment dispersion "CAB-O-JET 250C" (product name), manufactured by Cabot Corporation.
CAB-O-JET 260M: a magenta pigment dispersion "CAB-O-JET 260M" (product name), manufactured by Cabot Corporation.
CW-2: a black pigment dispersion "BONJET BLACK CW-2" (product name), manufactured by Orient Chemical Industries, Ltd.
CAB-O-JET 270Y: a yellow pigment dispersion "CAB-O-JET 270Y" (product name), manufactured by Cabot Corporation.
SUPERFLEX 460: a self-emulsifying water-based urethane resin "SUPERFLEX 460" (product name), manufactured by DKS Co., Ltd.
SURFYNOL 465: a surfactant "SURFYNOL 465" (product name), manufactured by Nissin Chemical Co., Ltd.

(2) Preparation of Pretreatment Liquids

The components shown in Table 3 were premixed in the proportions shown in Table 3, and were then dispersed for one minute using an ultrasonic dispersion device, thus obtaining a series of aqueous dispersions. As is evident from Table 3, the pretreatment liquids 1 to 3, 7, 14 and 15 each contained a single type of fine particle, whereas the pretreatment liquids 4 to 6 and 8 to 13 contained two types of fine particles having different primary particle sizes.

TABLE 3

|  |  | Pretreatment liquid 1 (wt %) | Pretreatment liquid 2 (wt %) | Pretreatment liquid 3 (wt %) | Pretreatment liquid 4 (wt %) | Pretreatment liquid 5 (wt %) | Pretreatment liquid 6 (wt %) | Pretreatment liquid 7 (wt %) | Pretreatment liquid 8 (wt %) |
|---|---|---|---|---|---|---|---|---|---|
| Fine Particles | AEROSIL OX50 (primary particle size 40 nm) | 7.5 | | | | | | | |
|  | SNOWTEX 30 (primary particle size 10 to 15 nm) 30% aqueous dispersion | | | | 12.5 | 12.5 | | 25.0 | 2.5 |
|  | SNOWTEX 20L (primary particle size 40 to 50 nm) 20% aqueous dispersion | | | | | 18.8 | 18.8 | | |
|  | SNOWTEX MP-2040 (primary particle size 170 to 230 nm) 40% aqueous dispersion | | 18.7 | | 9.4 | | 9.4 | | 16.9 |
|  | SNOWTEX MP-4540M (primary particle size 420 to 480 nm) 40% aqueous dispersion | | | 18.7 | | | | | |
| Water-dispersible resin (solid fraction) | SUMIELITE1010 (200 nm) | 0.4 | 0.4 | 0.4 | 0.4 | 0.4 | 0.4 | 0.4 | 0.4 |
|  | SUPERFLEX 460 (40 nm) | | | | | | | | |
|  | SUPERFLEX 470 (50 nm) | | | | | | | | |
|  | Water | 92.1 | 80.9 | 80.9 | 77.7 | 68.4 | 71.4 | 74.6 | 80.2 |
|  | Total (wt %) | 100 | 100 | 100 | 100 | 100 | 100 | 100 | 100 |
|  | Mass ratio (first fine particles/second fine particles) | 100/0 | 100/0 | 0/0 | 50/50 | 50/50 | 100/0 | 0/100 | 90/10 |

|  |  | Pretreatment liquid 9 (wt %) | Pretreatment liquid 10 (wt %) | Pretreatment liquid 11 (wt %) | Pretreatment liquid 12 (wt %) | Pretreatment liquid 13 (wt %) | Pretreatment liquid 14 (wt %) | Pretreatment liquid 15 (wt %) |
|---|---|---|---|---|---|---|---|---|
| Fine Particles | AEROSIL OX50 (primary particle size 40 nm) | | | | | | | |
|  | SNOWTEX 30 (primary particle size 10 to 15 nm) 30% aqueous dispersion | 5.0 | 10.0 | 15.0 | 20.0 | 22.5 | 25.0 | 25.0 |
|  | SNOWTEX 20L (primary particle size 40 to 50 nm) 20% aqueous dispersion | | | | | | | |
|  | SNOWTEX MP-2040 (primary particle size 170 to 230 nm) 40% aqueous dispersion | 15.0 | 11.3 | 7.5 | 3.8 | 1.9 | | |
|  | SNOWTEX MP-4540M (primary particle size 420 to 480 nm) 40% aqueous dispersion | | | | | | | |
| Water-dispersible | SUMIELITE1010 (200 nm) | 0.4 | 0.4 | 0.4 | 0.4 | 0.4 | | |
|  | SUPERFLEX 460 (40 nm) | | | | | | | 0.4 |

TABLE 3-continued

| | | | | | | | | |
|---|---|---|---|---|---|---|---|---|
| resin (solid fraction) | SUPERFLEX 470 (50 nm) | | | | | | | 0.4 |
| | Water | 79.6 | 78.4 | 77.1 | 75.9 | 75.2 | 74.6 | 74.6 |
| | Total (wt %) | 100 | 100 | 100 | 100 | 100 | 100 | 100 |
| | Mass ratio (first fine particles/second fine particles) | 80/20 | 60/40 | 40/60 | 20/80 | 10/90 | 0/100 | 0/100 |

Note:
first fine particles = fine particles with primary particle size of at least 40 nm but not more than 300 nm,
second fine particles = fine particles with primary particle size less than 40 nm
In Table 3, details relating to the various components are as follows.
AEROSIL OX50: a hydrophilic fumed silica "AEROSIL OX50" (product name), manufactured by Nippon Aerosil Co., Ltd., primary particle size: 40 nm.
SNOWTEX 30: a colloidal silica "SNOWTEX 30" (product name), manufactured by Nissan Chemical Industries, Ltd., primary particle size: 10 to 15 nm, 30% aqueous dispersion.
SNOWTEX 20L: a colloidal silica "SNOWTEX 20L" (product name), manufactured by Nissan Chemical Industries, Ltd., primary particle size: 40 to 50 nm, 20% aqueous dispersion.
SNOWTEX MP-2040: a colloidal silica "SNOWTEX MP-2040" (product name), manufactured by Nissan Chemical Industries, Ltd., primary particle size: 170 to 230 nm, 40% aqueous dispersion.
SNOWTEX MP-4540M: a colloidal silica "SNOWTEX MP-4540M" (product name), manufactured by Nissan Chemical Industries, Ltd., primary particle size: 420 to 480 nm, 40% aqueous dispersion.
SUMIELITE 1010: an ethylene-vinyl chloride copolymer resin emulsion "SUMIELITE 1010" (product name), manufactured by Sumika Chemtex Co., Ltd., primary particle size: 200 nm.
SUPERFLEX 460: a self-emulsifying water-based urethane resin "SUPERFLEX 460" (product name), manufactured by DKS Co., Ltd., particle size: 40 nm.
SUPERFLEX 470: a self-emulsifying water-based urethane resin "SUPERFLEX 470" (product name), manufactured by DKS Co., Ltd., particle size: 50 nm.

(3) Decoration of Humidity-Conditioning Construction Materials

For the humidity-conditioning construction material, a commercially available humidity-conditioning construction material A (thickness: 6 mm, surface roughness Ra: 15 μm, surface 60° gloss: 2.5) comprising both mesopores and macropores, and exhibiting an amount of moisture adsorption and desorption that satisfies grade 3 and an equilibrium moisture content that satisfies grade 3 of the humidity-conditioning performance evaluation standards was prepared. In Examples 1 to 3, 9 and 10, and in Comparative Examples 1 to 3, the humidity-conditioning construction material A was used without further modification, whereas in the other Examples and Comparative Examples, the surface of the humidity-conditioning construction material A was subjected to polishing to reduce the surface roughness Ra to 8 μm. Subsequently, using the inks shown in Table 4 and Table 5, the entire surface of each of the above humidity-conditioning construction materials A was subjected to inkjet printing of an image from nature (a pictorial image of a landscape or the like) or a wood grain image, and the humidity-conditioning construction material was then heated for 130 seconds on a 70° C. sheet heater to dry the printed surface. The recording surface area of the nature image used in this printing represented 100% of the printed area, and the recording surface area of the wood grain image also represented 100% of the printed area.

In Examples 1 to 17 and Comparative Examples 1 and 4, the aqueous inks 1 were used, in Comparative Example 2, ultraviolet-curable (UV) inks were used, and in Comparative Example 3, the aqueous inks 2 were used. Further, in Examples 1, 2 and 5 to 17 and Comparative Examples 1 and 4, prior to the inkjet printing, the surface of the humidity-conditioning construction material to be printed was sprayed with the pretreatment liquid shown in Table 4 or 5, and the surface was then dried by heating the humidity-conditioning construction material for 130 seconds on a 70° C. sheet heater. The coating amount of the pretreatment liquid was a liquid amount of 78 g/m² (a solid fraction amount of about 6.2 g/m²).

The surface roughness Ra of the portion to be printed on the humidity-conditioning construction material was measured using a VK-8700 (product name) manufactured by Keyence Corporation. The "portion to be printed" means the surface of the humidity-conditioning construction material A itself in those cases where no pretreatment with a pretreatment liquid is performed, or means the pretreated surface of the humidity-conditioning construction material A in those cases where a pretreatment with a pretreatment liquid is performed.

(4) Evaluation of Decorated Surfaces

The decorative humidity-conditioning construction materials obtained in (3) above were evaluated using the methods described below. The results are shown in Table 4 and Table 5.

(4-1) Objective Visual Evaluation (Evaluation of Image Density and Bleeding)

The nature image printed on the humidity-conditioning construction material was inspected visually, and the image density and bleeding (lack of blurring) were evaluated against the following criteria.

AA: density and bleeding were both good, an extremely good image representation.

A: density and bleeding were both good, a good image representation.

B: slight problems in terms of the density or bleeding.

C: image representation was not possible.

(4-2) Gloss of Decorative Portion

The 60° gloss value of the surface of the wood grain image printed on the humidity-conditioning construction material was measured using a Multi-Gloss 268 (product name) manufactured by Konica Minolta, Inc.

(4-3) Performance Evaluation of Decorated Humidity-Conditioning Construction Material For each of the decorated humidity-conditioning construction materials, the amount of moisture adsorption and desorption prescribed in JIS A 1470-1 and the equilibrium moisture content prescribed in JIS A 1475 were measured and evaluated against the following criteria.

A: the grade was maintained for all items.

B: the grade decreased for one item.

C: the grade decreased for two or more items, or at least one grade fell to a level below grade 1.

(4-4) Evaluation of Water Abrasion Resistance of Printed Image

The nature image printed on the humidity-conditioning construction material was rubbed with a wet sponge and evaluated against the following criteria.

AA: the image was not removed even after 30 or more sponge rubbing repetitions.

A: the image was removed after 10 or more but less than 30 sponge rubbing repetitions.

B: the image was removed after 5 or more but less than 10 sponge rubbing repetitions.

C: the image was removed after less than 5 sponge rubbing repetitions.

TABLE 4

|  |  | Example 1 | Example 2 | Example 3 | Example 4 | Example 5 | Example 6 |
|---|---|---|---|---|---|---|---|
| Pretreatment liquid | Type | Pretreatment liquid 1 | Pretreatment liquid 2 | none | none | Pretreatment liquid 4 | Pretreatment liquid 5 |
|  | Mass ratio (first fine particles/ second fine particles) | 100/0 | 100/0 |  |  | 50/50 | 50/50 |
|  | Primary particle size of water-dispersible resin | 200 nm | 200 nm |  |  | 200 nm | 200 nm |
|  | Ink type | Aqueous ink 1 | Aqueous ink 1 | Aqueous ink 1 | Aqueous ink 1 | Aqueous ink 1 | Aqueous ink 1 |
|  | Polishing | no | no | no | yes | yes | yes |
|  | Surface roughenss Ra (μm) of portion to be printed | 8 | 8 | 15 | 8 | 8 | 8 |
|  | Objective viusal evaluation | AA | AA | A | A | AA | AA |
|  | 60° gloss value (decorative portion) | 13.1 | 12.6 | 2.3 | 2.3 | 23.8 | 23.9 |
|  | Humidity-conditioning construction material performance evaluation | A | A | A | A | A | A |
|  | Evaluation of water abrasion resistance of image | AA | AA | AA | AA | AA | AA |

|  |  | Example 7 | Example 8 | Example 9 | Example 10 | Example 11 |
|---|---|---|---|---|---|---|
| Pretreatment liquid | Type | Pretreatment liquid 6 | Pretreatment liquid 7 | Pretreatment liquid 4 | Pretreatment liquid 7 | Pretreatment liquid 8 |
|  | Mass ratio (first fine particles/ second fine particles) | 100/0 | 0/100 | 50/50 | 0/100 | 90/10 |
|  | Primary particle size of water-dispersible resin | 200 nm | 200 nm | 200 nm | 200 nm | 200 nm |
|  | Ink type | Aqueous ink 1 | Aqueous ink 1 | Aqueous ink 1 | Aqueous ink 1 | Aqueous ink 1 |
|  | Polishing | yes | yes | no | no | yes |
|  | Surface roughenss Ra (μm) of portion to be printed | 8 | 8 | 8 | 15 | 8 |
|  | Objective viusal evaluation | AA | AA | AA | AA | AA |
|  | 60° gloss value (decorative portion) | 19.4 | 16 | 13 | 14 | 24.3 |
|  | Humidity-conditioning construction material performance evaluation | A | A | A | A | A |
|  | Evaluation of water abrasion resistance of image | AA | AA | AA | AA | AA |

Note:
first fine particles = fine particles with primary particle size of at least 40 nm but not more than 300 nm,
second fine particles = fine particles with primary particle size less than 40 nm

TABLE 5

|  |  | Example 12 | Example 13 | Example 14 | Example 15 | Example 16 |
|---|---|---|---|---|---|---|
| Pretreatment liquid | Type | Pretreatment liquid 9 | Pretreatment liquid 10 | Pretreatment liquid 11 | Pretreatment liquid 12 | Pretreatment liquid 13 |
|  | Mass ratio (first fine particles/ second fine particles) | 80/20 | 60/40 | 40/60 | 20/80 | 10/90 |
|  | Primary particle size of water-dispersible resin | 200 nm | 200 nm | 200 nm | 200 nm | 200 nm |
|  | Ink type | Aqueous ink 1 | Aqueous ink 1 | Aqueous ink 1 | Aqueous ink 1 | Aqueous ink 1 |
|  | Polishing | yes | yes | yes | yes | yes |
|  | Surface roughenss Ra (μm) of portion to be printed | 8 | 8 | 8 | 8 | 8 |
|  | Objective viusal evaluation | AA | AA | AA | AA | AA |
|  | 60° gloss value (decorative portion) | 24.1 | 24 | 23 | 22.7 | 18.1 |
|  | Humidity-conditioning construction material performance evaluation | A | A | A | A | A |
|  | Water abrasion resistance evaluation for image | AA | AA | AA | AA | AA |

TABLE 5-continued

|  |  | Example 17 | Comparative Example 1 | Comparative Example 2 | Comparative Example 3 | Comparative Example 4 |
|---|---|---|---|---|---|---|
| Pretreatment liquid | Type | Pretreatment liquid 15 | Pretreatment liquid 3 | none | none | Pretreatment liquid 14 |
|  | Mass ratio (first fine particles/ second fine particles) | 0/100 | — |  |  | 0/100 |
|  | Primary particle size of water-dispersible resin | 50 nm | 200 nm |  |  | 40 nm |
|  | Ink type | Aqueous ink 1 | Aqueous ink 1 | UV ink | Aqueous ink 2 | Aqueous ink 1 |
|  | Polishing | yes | no | no | no | yes |
|  | Surface roughenss Ra (µm) of portion to be printed | 8 | 8 | 15 | 15 | 8 |
|  | Objective viusal evaluation | AA | AA | B | A | A |
|  | 60° gloss value (decorative portion) | 16 | 12.9 | 2.8 | 2.4 | 8.2 |
|  | Humidity-conditioning construction material performance evaluation | A | A | C | A | A |
|  | Water abrasion resistance evaluation for image | A | B | C | C | B |

Note:
first fine particles = fine particles with primary particle size of at least 40 nm but not more than 300 nm,
second fine particles = fine particles with primary particle size less than 40 nm The results in Table 4 and Table 5 reveal the following. Based on the results of Examples 1 to 17, it is evident that by performing inkjet printing using aqueous inks containing a water-dispersible resin, a high-quality image with excellent water abrasion resistance can be formed on the humidity-conditioning construction material without impairing the humidity-conditioning performance of the humidity-conditioning construction material, namely with retention of the same grade.

In particular, based on comparison of Example 4 and Examples 5 to 8, or comparison of Example 3 and Example 9, it is evident that when the material is pretreated with a pretreatment liquid containing fine particles having a primary particle size of not more than 300 nm, the quality and gloss of the decorative portion image improve, and in this case, as is evident from a comparison of Example 9 and Example 5, polishing the humidity-conditioning construction material prior to the pretreatment to reduce the surface roughness Ra yields a further improvement in the gloss of the decorative portion. It is thought that polishing removes any significant unevenness, leading to improved image quality.

Based on a comparison of Example 5 or 6 and Examples 7 and 8, it is evident that when the fine particles in the pretreatment liquid are composed of a mixture of particles of large particle size (first fine particles) having a primary particle size of at least 40 nm but not more than 300 nm and particles of small particle size (second fine particles) having a primary particle size of less than 40 nm, the gloss of the decorative portion can be further improved.

Based on Examples 11 to 16, it is evident that from the viewpoint of the gloss of the decorative portion, the blend ratio of the first fine particles relative to a total value of 100% by weight for the combination of the first fine particles and the second fine particles is preferably from 5 to 95% by weight, more preferably from 15 to 95% by weight, and most preferably from 50 to 95% by weight.

As shown in Examples 3 and 4, a favorable image can be formed even without performing a pretreatment, but in those cases where a pretreatment was performed, as shown by the result for Comparative Example 1, if a pretreatment liquid containing fine particles having a primary particle size exceeding 300 nm was used, the water abrasion resistance of the image deteriorated. Similarly, in Comparative Example 4 which used a pretreatment liquid containing a water-dispersible resin having a primary particle size of 40 nm, the water abrasion resistance of the image was inferior.

In Comparative Example 2 which used conventional ultraviolet-curable (UV) inks, not only was the quality of the image slightly inferior, but the humidity-conditioning performance of the humidity-conditioning construction material and the water abrasion resistance of the image also deteriorated.

In Comparative Example 3 which used aqueous inks containing a water-soluble resin instead of the water-dispersible resin, the water abrasion resistance of the image deteriorated. It is thought that if a water-soluble resin such as a polyvinyl alcohol is used, then the hydrophilicity of the porous base material surface increases, causing a deterioration in the water resistance of the printed surface.

Example 18

Using the prescribed inkjet nozzle with the ink drop volume set to "small" and the resolution set to "medium", the unidirectional printing mode was used to perform inkjet printing using the aforementioned aqueous inks 1 of a nature image across the entire surface of a humidity-conditioning construction material B (thickness: 9.5 mm) shown in Table 6 while the material was heated on a 70° C. sheet heater. Subsequently, the humidity-conditioning construction material was heated for 130 seconds on a 70° C. sheet heater to dry the printed surface. The thus obtained decorative surface was evaluated using the same methods as those described above. The results are shown in Table 7.

Examples 19 to 21

With the exceptions of using a humidity-conditioning construction material C (thickness 5.5 mm) shown in Table 6, and altering the printing conditions to the conditions shown in Table 7, decoration and subsequent evaluation were performed in the same manner as Example 18. The results are shown in Table 7.

TABLE 6

|  | Amount of moiusture adsoprtion and desorption | Equilibrium moisture content |
|---|---|---|
| Humidity-conditioning construction material B | Grade 1 | Grade 1 |
| Humidity-conditioning construction material C | Grade 3 | Grade 3 |

TABLE 7

|  |  | Example 18 | Example 19 | Example 20 | Example 21 |
|---|---|---|---|---|---|
| Humidity-conditioning construction material |  | B | C | C | C |
| Printing conditions | Ink drop volume | small | medium | medium | large |
|  | Resolution | medium | high | medium | high |
|  | Printing direction | unidirectional | bidirectional | bidirectional | bidirectional |
|  | Heating of porous base material | yes | no | yes | no |
| Objective viusal evaluation |  | AA | AA | AA | B |
| Retention of humidity-conditioning construction material performance |  | A | A | A | A |
| Water abrasion resistance of image |  | AA | AA | AA | AA |

Based on the results in Table 7, it is evident that the method for producing a decorative article (the decoration method) according to the present invention can be used for decorating a humidity-conditioning construction material having an amount of moisture adsorption and desorption prescribed in JIS A 1470-1 of grade 1 or higher and an equilibrium moisture content prescribed in JIS A 1475 of grade 1 or higher.

Examples 22 to 26, Comparative Examples 5 and 6

With the exception of replacing the water-dispersible resin with each of the resins described below, aqueous inks 3 to 6 were prepared in the same manner as the aqueous inks 1 described above.

Aqueous inks 3: SF460S: a self-emulsifying water-based urethane resin "SUPERFLEX 460S" (product name), manufactured by DKS Co., Ltd., primary particle size 30 nm.

Aqueous inks 4: SF150HS: a self-emulsifying water-based urethane resin "SUPERFLEX 150HS" (product name), manufactured by DKS Co., Ltd., primary particle size 80 nm.

Aqueous inks 5: SF420: a self-emulsifying water-based urethane resin "SUPERFLEX 420" (product name), manufactured by DKS Co., Ltd., primary particle size 10 nm.

Aqueous inks 6: SF740: a self-emulsifying water-based urethane resin "SUPERFLEX 740" (product name), manufactured by DKS Co., Ltd., primary particle size 200 nm.

Using each of the aqueous inks 3 to 6 described above, humidity-conditioning construction materials were either decorated with no pretreatment in the same manner as described above for Example 3, or decorated following pretreatment using the pretreatment liquid 4 in the same manner as described above for Example 5, and the decorated materials were then evaluated. Further, the discharge stability (printing stability) was also evaluated by determining whether printing without nozzle clogging was possible (evaluation A) or impossible (evaluation C) for the nature image and the wood grain image used in the aforementioned objective visual evaluation. The results are shown in Table 8.

Although not shown in the table below, this discharge stability evaluation was also performed for the aforementioned aqueous inks 1, and good discharge stability (evaluation A) was obtained.

TABLE 8

|  |  | Example 22 | Example 23 | Example 24 | Example 25 | Example 26 | Comparative Example 5 | Comparative Example 6 |
|---|---|---|---|---|---|---|---|---|
|  | Pretreatment liquid | None | none | pretreatment liquid 4 | pretreatment liquid 4 | none | none | pretreatment liquid 4 |
| Ink | Type | Aqueous inks 3 | Aqueous inks 4 | Aqueous inks 3 | Aqueous inks 4 | Aqueous inks 5 | Aqueous inks 6 | Aqueous inks 6 |
|  | Particle size of water-dispersible resin | 30 nm | 80 nm | 30 nm | 80 nm | 10 nm | 200 nm | 200 nm |
|  | Polishing | No | no | yes | yes | no | no | yes |
|  | Surface roughenss Ra (μm) of portion to be printed | 15 | 15 | 8 | 8 | 15 | 15 | 8 |
|  | Objective viusal evaluation | A | A | AA | AA | A | A | A |
|  | 60° gloss value (decorative portion) | 2.3 | 2.3 | 24.2 | 23.5 | 2.3 | 1.0 | 3.2 |
|  | Humidity-conditioning construction material performance evaluation | A | A | A | A | A | A | A |
|  | Evaluation of water abrasion resistance of image | AA | AA | AA | AA | AA | C | B |
|  | Discharge stability (printing stability) | A | A | A | A | A | A | A |

INDUSTRIAL APPLICABILITY

According to the present invention, a porous base material having a humidity-conditioning function such as a humidity-conditioning construction material can be decorated without impairing the humidity-conditioning performance of the porous base material, and therefore the invention can be widely used for decoration applications in the field of construction materials that require a humidity-conditioning function and in other fields for articles that require a humidity-conditioning function.

This Application is related to the subject matter disclosed in prior Japanese Application 2013-248224 filed on Nov. 29, 2013, prior Japanese Application 2014-093740 filed on Apr. 30, 2014, and prior Japanese Application 2014-198206 filed on Sep. 29, 2014; the entire contents of which are incorporated herein by reference.

It should be noted that, besides the embodiments already described above, various modifications and variations can be made in these embodiments without departing from the novel and advantageous features of the present invention. Accordingly, it is intended that all such modifications and variations are included within the scope of the appended claims.

DESCRIPTION OF THE REFERENCE SIGNS

1: Porous base material
10: Recording head section
10Y, 10M, 10C, 10K: Head units
20: Transport section
21: Roller
22: Conveyor belt
30: Pretreatment liquid coating section
40: Heating device

The invention claimed is:

1. A method for producing a decorative article, comprising: a step of performing inkjet printing onto a surface of a humidity-conditioning base material using an aqueous inkjet ink consisting essentially of water, a water-dispersible resin, a colorant, a surfactant, and a water-soluble organic solvent.

2. The method according to claim 1, further comprising, prior to the inkjet printing step, a pretreatment step of applying a pretreatment liquid containing at least water, a water-dispersible resin, and fine particles having an average primary particle size of not more than 300 nm to the surface of the humidity-conditioning base material.

3. The method according to claim 2, wherein the fine particles having an average primary particle size of not more than 300 nm are composed of a mixture of first fine particles having an average primary particle size that is equal to or greater than an average primary particle size of the water-dispersible resin contained in the aqueous inkjet ink, and second fine particles having an average primary particle size that is smaller than an average primary particle size of the water-dispersible resin contained in the aqueous inkjet ink.

4. The method according to claim 3, wherein a surface of the humidity-conditioning base material comprises mesopores and macropores having a larger diameter than the mesopores, and an average primary particle size of the water-dispersible resin contained in the aqueous inkjet ink is smaller than a maximum value for a diameter of the mesopores.

5. The method according to claim 1, wherein an average primary particle size of the water-dispersible resin contained in the aqueous inkjet ink is at least 5 nm but not more than 150 nm.

6. The method according to claim 2, wherein an average primary particle size of the water-dispersible resin contained in the pretreatment liquid is greater than 40 nm.

7. The method according to claim 1, wherein the humidity-conditioning base material exhibits an amount of moisture adsorption, measured after 3 hours in accordance with JIS A 1470-1 (2002), that is greater than 15 g/m$^2$.

8. The method according to claim 1, wherein the aqueous inkjet ink comprises at least 60% by weight of water relative to a total weight of the ink, and a weight ratio of an amount of the colorant relative to an amount of the water-dispersible resin (colorant: water-dispersible resin) is within a range from 1:0.5 to 1:7.

9. The method according to claim 1, wherein the humidity-conditioning base material comprises a calcium silicate containing an unexpanded vermiculite.

10. A decorative article, comprising:
an image formed by inkjet printing on a surface of a humidity-conditioning base material, wherein the image is formed using an aqueous inkjet ink consisting essentially of water, a water-dispersible resin, a colorant, a surfactant, and a water-soluble organic solvent.

11. The decorative article according to claim 10, wherein the image is formed on the surface of the humidity-conditioning base material that has been coated with a pretreatment liquid containing at least water, a water-dispersible resin, and fine particles having an average primary particle size of not more than 300 nm.

12. The decorative article according to claim 10, wherein the humidity-conditioning base material exhibits an amount of moisture adsorption, measured after 3 hours in accordance with JIS A 1470-1 (2002), that is greater than 15 g/m$^2$.

13. A method for producing a decorative article, comprising:
a step of performing inkjet printing onto a surface of a humidity-conditioning base material using an aqueous inkjet ink containing at least water, a water-dispersible resin, and a colorant, wherein the aqueous inkjet ink consists essentially of water, a water-dispersible resin, a colorant, and a water-soluble organic solvent.

14. A decorative article comprising:
an image formed by inkjet printing on a surface of a humidity-conditioning base material, wherein the aqueous inkjet ink consists essentially of water, a water-dispersible resin, a colorant, and a water-soluble organic solvent.

15. A method for producing a decorative article, comprising:
a pre-treatment step of applying a pretreatment liquid to a surface of a humidity-conditioning base material, the pretreatment liquid containing at least water, a water-dispersible resin, and fine particles having an average primary particle size of not more than 300 nm; and
a step of performing inkjet printing onto the pre-treated surface of the humidity-conditioning base material using an aqueous inkjet ink containing at least water, a water-dispersible resin, and a colorant,
wherein the fine particles are composed of a mixture of first fine particles and second fine particles, the first fine particles having an average primary particle size that is equal to or greater than an average primary particle size of the water-dispersible resin contained in the aqueous inkjet ink, and the second fine particles having an average primary particle size that is smaller than an average primary particle size of the water-dispersible resin contained in the aqueous inkjet ink.

* * * * *